2,854,468
SEPARATION OF ALKALINE EARTH METAL SALTS OF MONO- AND DIALKYL ACID PHOSPHATES

Nicolaas Max, Amsterdam, Netherlands, assignor to Shell Development Company, Emeryville, Calif., a corporation of Delaware No Drawing. Application January 7, 1954
Serial No. 402,817

Claims priority, application Netherlands February 2, 1953

9 Claims. (Cl. 260—461)

This invention relates to a process for separating monoalkyl esters of phosphoric acid from dialkyl esters of phosphoric acid.

A class of chemical compounds possessing highly desirable properties as surface-active agents comprises the alkyl acid phosphates, which can be prepared by reaction of higher aliphatic alcohols, such as nonyl, decyl, or lauryl alcohols, with phosphorus pentoxide. The products of this reaction are mixtures comprising primarily monoalkyl acid phosphates and dialkyl acid phosphates. While the surface-active properties of the mixtures of phosphates thus obtained are sufficient for some purposes, it has been found that the dialkyl acid phosphates possess surface-active properties substantially more desirable in kind and degree than those possessed by the monalkyl acid phosphates. Hence, for many purposes, it becomes quite important that the two classes of acid phosphates be separated. It has been proposed to effect the separation of a mixture of mono- and dialkyl phosphates by fractional crystallization of suitable salts, particularly the barium salts, of these acid phosphates from water solutions. However, as stated by G. M. Kosolapoff ("Organo-phosphorus Compounds," Wiley and Sons (1950), at page 221 thereof) this separation method has not been found to be effective in separating the (higher alkyl)-substituted acid phosphates. It is the object of the present invention, therefore, to provide an effective, easily performed method for accomplishing the separation of mono (higher alkyl) acid phosphates from di (higher alkyl) acid phosphates and, hence, to provide a practical method for obtaining in substantially pure form the desirable dialkyl acid phosphate.

It is my discovery that di (higher alkyl) acid phosphate may be almost completely removed from a mixture of mono(higher alkyl)- and di(higher alkyl) acid phosphates by extracting a mixture of the lower alkaline earth metal salts of these acid phosphates with at least one non-polar or slightly polar hydrocarbon. To be more specific, it has been discovered that when a lower alkaline earth metal salt of a dialkyl acid phosphate in which the alkyl groups each contain at least 7 carbon atoms is present in admixture with a corresponding metallic salt of the corresponding monoalkyl acid phosphate, the salt of the dialkyl acid phosphate can be selectively extracted from the mixture by means of a non-polar or slightly polar hydrocarbon solvent. The process of the invention therefore comprises intimately contacting a mixture of the lower alkaline earth metal salts of alkyl-substituted acid phosphates with at least one non-polar or slightly polar hydro-carbon and separating the solution from the solid residue (which comprises the metallic salt of the monoalkyl acid phosphate). In another aspect, the process of the invention comprises converting the mixture of alkyl-substituted acid phosphates to the corresponding lower alkaline earth metal salts, extracting the mixture of salts with a non-polar or slightly polar hydrocarbon, separating the solution from the solid, and treating the solid with a weak acid solution to convert it to the monoalkyl acid phosphate. The dialkyl acid phosphate may be recovered by distilling off the solvent and treating the resulting solid with a weak acid solution to spring the dialkyl acid phosphate.

The mixtures of alkyl-substituted acid phosphates to which this novel method of separation applies are mixtures of those acid phosphates in which the alkyl groups each contain at least 7 carbon atoms and a preferred class of these mixtures comprises mixtures of mono- and dialkyl-substituted acid phosphates in which each alkyl group contains from 8 to 18 carbon atoms, inclusive. The alkyl group may be of straight-chain configuration or it may have a branched-chain structure. Representative mixtures include, among others, mixtures of mono- and dinonyl acid phosphates, mono- and didecyl acid phosphates, mono- and dilauryl acid phosphates, mono- and dicetyl acid phosphates, mono- and dimyristyl acid phosphates, mono- and di(3,5,5-trimethylhexyl) acid phosphates, mono- and di-(2,2,4-trimethylpentyl) acid phosphates, mono- and di-(2,3-dimethylhexyl) acid phosphates, mono- and di-(2-methyl-3-ethylpentyl) acid phosphates, and the like. A preferred mixture comprises that obtained by the reaction of those higher aliphatic alcohols known to the art as "oxo alcohols"—mixtures of alcohols containing from about 8 to about 18 carbon atoms per molecule—with phosphorus pentoxide.

The mixture of mono- and dialkyl acid phosphates may be prepared for separation by converting the alkyl-substituted acid phosphates to the corresponding lower alkaline earth metal salts. This may be accomplished by adding to the mixture of alkyl-substituted acid phosphates an aqueous solution of a lower alkaline earth metal hydroxide in an amount sufficient to convert all of the alkyl-substituted acid phosphates to the corresponding metallic salts. It is desirable to insure complete conversion that a slight excess of the hydroxide be used. However, a large excess is undesirable for the reason that excess hydroxide must be neutralized before the desired alkyl-substituted acid phosphate can be sprung (by treatment with a weak acid) from the metallic salt. Thus, a large excess of the hydroxide results in an unnecessary and undesirable waste of the acid used to spring the desired monoalkyl acid phosphate. A convenient method for determining the excess of hydroxide present comprises measuring the pH of the solution. When determined by this technique, the desired excess of hydroxide should be such that the final pH of the solution lies between about 9.0 and about 10.5, the optimum pH lying at about 10.0.

In cases where the lower alkaline earth metal hydroxide is but sparingly soluble in water, an effective method for converting the alkyl-substituted acid phosphates to their lower alkaline earth metal salts comprises treating the mixture of acid phosphates with a solution of a water-soluble hydroxide, such as sodium or potassium hydroxide, and then reacting the resulting solution of mixed alkali metal salts with a water-soluble salt of the lower alkaline earth metal, such as the lower alkaline earth metal halide or nitrate, so that the lower alkaline earth metal salts of the alkyl-substituted acid phosphates are precipitated.

By the term "lower alkaline earth metal" is meant a metal classified in group IIA of the Periodic Table of the Elements (as given in The Merck Index, sixth edition (1952)), having an atomic number below 40—e. g., the metals magnesium, calcium, beryllium, and strontium. In general, it has been found that the solubility of the metallic salt of the dialkyl acid phosphates decreases with increasing atomic weight, the salts of the lighter members of this group of lower alkaline earth metals exhibiting the greatest solubility. Therefore, it is preferred that the lower alkaline earth metal salt or hydroxide employed in the process of the invention be a magnesium compound since the difference between the solubility of the magnesium salt of the dialkyl acid phosphate and that of the magnesium salt of the monoalkyl acid phosphate is greater than that of the corresponding calcium or strontium salts, and the beryllium salts are much less widely available at low cost.

The temperature at which the conversion may be effected is not a critical factor in the process of the present invention. In general, while ordinary room temperatures will be satisfactory, a moderate increase in temperature may be desirable in some cases to attain complete reaction within a shorter time. For this purpose, temperatures below about 70° C. will be found suitable.

Following the conversion of the alkyl-substituted acid phosphates to the metallic salts, the mixture is prepared for selective extraction by removing substantially all of the water and any alcohol present in the mixture. It is essential that substantially all of the water and alcohol present be removed, since the solubility characteristics of the various salts present in water and/or alcohol differs from their solubility characteristics in non-polar or slightly polar hydrocarbons, and this difference may cause difficulty in separation if water and/or alcohol are present when extraction with the hydrocarbon is effected.

The separation of the metallic salts of the mono- and dialkyl acid phosphates is effected by intimately contacting the substantially anhydrous reaction mixture with at least one non-polar or slightly polar hydrocarbon as selective solvent. By the term "non-polar or slightly polar hydrocarbon" is meant any unsubstituted hydrocarbon which has an electric dipole moment not greater than exhibited by branched-chain hydrocarbons—e. g., an electric dipole moment less than about 1.0 Debye unit. It is preferred that the electric dipole moment of the hydrocarbon be 0.0. By the term "Debye unit" is meant that measurement of electric dipole moment normally given this name. One Debye unit is defined to equal $1 \times 10^{-18}$ electrostatic units. As used in this specification, the term "electric dipole moment" has its usual meaning—e. g., it is a description or measure of the magnitude of the dipole electrostatic field existing in a given organic compound, the magnitude of the moment being the product of either of the two (opposite) electrostatic charges and the distance between those charges. Further, the term "electric dipole moment" is herein used to mean the electric dipole moment of a compound which is in the pure liquid state or is dissolved in a suitable solvent, the value of the moment being determined for the compound or solution at ordinary temperatures—e. g., about 20 to 25° C. The value(s) of such dipole moment(s) for given organic compounds in the pure form or in representative solvent are given in such compilations of physical data as "Tables of Electric Dipole Moments" compiled by L. G. Wesson, The Technology Press (1948).

Hydrocarbons which may be employed include aliphatic hydrocarbons, such as unsubstituted straight-chain hydrocarbons pentane, hexane, and the like; unsubstituted branched-chain hydrocarbons, such as isopentane, 2,2-dimethylpropane, 2-methylpentane, 2,2- and 2,3-dimethylbutene, 2,2- and 2,4-dimethylpentane, and the like; and unsubstituted cyclic hydrocarbons, such as cyclopentane, cyclohexane, and cyclooctane. There also may be employed unsubstituted aromatic hydrocarbons, such as benzene, and alkyl-substituted aromatic hydrocarbons, such as toluene or xylene. Mixtures of these compounds—straight-chain, branched-chain, cyclic or aromatic—such as are found in gasoline or other petroleum fractions may also be used. It is preferred that the solvent employed be an unsubstituted straight-chain hydrocarbon such as pentane, hexane, or a homolog of these hydrocarbons.

The extraction may be carried out in any manner known to the art. For example, the solvent and mixture of the metallic salts of the alkyl-substituted acid phosphates may simply be mixed or agitated together, or in some cases, such apparatus as a Soxhlet extractor be employed to advantage. Generally, the extraction may be carried out at room temperature, but in some cases moderately elevated temperatures (temperatures below about 150° C., for example) may be employed with advantage to accelerate the rate of solution. It is preferred that the extraction temperature be between about 20° C. and about 125° C.

The amount of solvent employed will depend upon the particular mixture of metallic salts of alkyl-substituted acid phosphates to be separated, the metallic constituent of the salts, the solvent employed, and the temperature contemplated. As a general rule, a slight excess of solvent over that theoretically required to effect complete solution of the metallic salt of the dialkyl acid phosphate may be employed to insure that complete solution does occur. The excess should not be great, however, since the metallic salt of the monoalkyl acid phosphate, although relatively quite insoluble in the solvent as compared to the metallic salt of the corresponding dialkyl acid phosphate, may be slightly soluble in the solvent and the employment of an amount of solvent greatly in excess of that required to effect complete solution of the metallic salt of the dialkyl acid phosphate thus would result in an unnecessary loss of the metallic salt of the monoalkyl acid phosphate and, further, would reduce the degree of separation. An excess of solvent of from about 1% to about 5% by weight over that theoretically required will be found entirely appropriate for this purpose.

The desired metallic salt of the monoalkyl-substituted acid phosphate remains as the residue following extraction and may be converted to the monoalkyl acid ester by any of the methods known in the art for preparing organic acids from their salts. A suitable method consists of treating the metallic salt with a dilute solution of an acid, for example, a mineral acid such as hydrochloric acid in dilute aqueous solution, and separating the alkyl esters from the inorganic salt formed by means of a suitable organic solvent, such as a lower aliphatic alcohol or an aliphatic hydrocarbon.

The dialkyl acid phosphate may be obtained by evaporating the hydrocarbon in which it is dissolved and treating the resulting solid salt to spring the alkyl esters, as delineated above, with the monoalkyl acid phosphate.

The invention is illustrated by the following specific examples. It is to be understood that there is no intention that the invention be limited in any manner by any details thereof, since many variations may be made within the scope of the claimed invention.

*Example I*

A mixture of phosphates resulting from the reaction of 152 grams of phosphorus pentoxide and 608 grams of 3,5,5-trimethyl hexanol was treated with 1 N aqueous sodium hydroxide solution until the pH of the mixture was 10.2. The unreacted alcohol was removed by steam distillation and a stoichiometric quantity of calcium nitrate in the form of an aqueous solution containing 10% by weight calcium nitrate was added. The precipitate was filtered off, treated and extracted at 18° C. with one litre of pentane. Substantially all of the calcium salt of dinonyl phosphate was dissolved. The residue consisted of the calcium salt of mononony phosphate and a small amount of inorganic calcium phosphate.

*Example II*

The above example was repeated, substituted for the pentane as solvent an equal volume of isooctane (2,2,4-trimethyl pentane). Again, substantially complete separation of the dialkyl salts from the monoalkyl salts was effected.

I claim as my invention:

1. A process for the separation of a monoalkyl acid phosphate from a mixture of a monoalkyl acid phosphate and a dialkyl acid phosphate, in which acid phosphates each alkyl group contains from 7 to 18 carbon atoms, comprising converting the alkyl-substituted acid phosplates to the corresponding salts of an alkaline metal having an atomic number less than 40, removing substantially all of any water and alcohol present, selectively extracting the resulting mixture of solid alkaline earth metal salts with a solvent consisting of at least one liquid unsubstituted saturated aliphatic hydrocarbon having an electric dipole moment of less than 1.0 Debye unit and separating the solid alkaline earth metal salt of the monoalkyl acid phosphate from the resulting liquid phase, which liquid phase comprises a solution of the alkaline earth metal salt of the dialkyl acid phosphate in the solvent.

2. The process of claim 1 in which the solvent is a straight-chain hydrocarbon.

3. The process of claim 2 wherein the solvent is pentane.

4. The process of claim 2 wherein the solvent is 2,2,4-trimethyl pentane.

5. A process for the separation of a monoalkyl acid phosphate from a mixture of mono- and dialkyl acid phosphates, in which phosphates each alkyl group contains from 7 to 18 carbon atoms, comprising reacting a mixture of said acid phosphates with a hydroxide of an alkaline earth metal having an atomic number below 40, removing substantially all of any water present, selectively extracting the resulting mixture of solid alkaline earth metal salts with a solvent consisting of at least one liquid unsubstituted saturated aliphatic hydrocarbon having an electric dipole moment of less than 1.0 Debye unit and separating the solid alkaline earth metal salt of the monoalkyl acid phosphate from the resulting liquid phase, which liquid phase comprises a solution of the alkaline earth metal salt of the dialkyl acid phosphate in the solvent.

6. The process of claim 5 in which the amount of alkaline earth metal hydroxide reacted with the acid phosphates is such that the pH of the resulting mixture is above about 8.0.

7. The process of claim 6 wherein the solvent is a straight-chain hydrocarbon.

8. A process for the separation of a monoalkyl acid phosphate from a mixture of mono- and dialkyl acid phosphates, in which phosphates each alkyl group contains from 7 to 18 carbon atoms, comprising reacting a mixture of said acid phosphates with an aqueous solution of an alkali metal hydroxide to form the corresponding alkali metal salts of the acid phosphates in said mixture, thereafter reacting the resulting mixture of alkali metal salts with a water-soluble salt of an alkaline earth metal having an atomic number below 40, separating the solid phase, which comprises a mixture of the alkaline earth metal salts of the mono- and dialkyl acid phosphates, from the liquid phase, selectively extracting the solid phase with a solvent consisting of at least one liquid unsubstituted saturated aliphatic hydrocarbon having an electric dipole moment of less than 1.0 Debye unit and separating the solid alkaline earth metal salt of the monoalkyl acid phosphate from the resulting liquid phase which liquid phase comprises a solution of the alkaline earth metal salt of the dialkyl acid phosphate in the solvent.

9. The process of claim 8 wherein the solvent is a straight-chain hydrocarbon.

References Cited in the file of this patent

UNITED STATES PATENTS

| | | |
|---|---|---|
| 1,869,768 | Nicolai et al. | Aug. 2, 1932 |
| 2,193,965 | Hochwalt | Mar. 19, 1940 |
| 2,573,658 | Weesner | Oct. 30, 1951 |
| 2,658,909 | Crandall et al. | Nov. 10, 1953 |

OTHER REFERENCES

Chemical Trade Journal & Chemical Engineer, page 62, Jan. 16, 1942.

Kosolapoff: Organo Phosphorus Compounds, page 221, 1950.

Stewart: Jour, A. C. S., vol. 73, pp. 1377–8, 1951.